United States Patent [19]

Quinn

[11] Patent Number: 4,535,924
[45] Date of Patent: Aug. 20, 1985

[54] APPARATUS FOR SUPPORTING A PIPE AND PIPE SNAPPING TOOL

[76] Inventor: Harold F. Quinn, 8003-13th Ave. South, Bloomington, Minn. 55420

[21] Appl. No.: 602,436

[22] Filed: Apr. 20, 1984

[51] Int. Cl.³ .............................................. B26F 3/00
[52] U.S. Cl. ..................................... 225/104; 30/100; 269/297
[58] Field of Search .............................. 225/103–105, 225/97, 93; 30/92, 95–101; 269/296, 297

[56] References Cited

U.S. PATENT DOCUMENTS

| | | | |
|---|---|---|---|
| 3,049,956 | 8/1962 | Lynch, Sr. | 83/467 |
| 3,084,431 | 4/1963 | Steierman | 30/164.9 |
| 3,244,339 | 4/1966 | Carner | 225/104 |
| 3,283,978 | 11/1966 | Coblitz | 225/103 |
| 3,341,098 | 9/1967 | Singley | 225/104 |

*Primary Examiner*—Frank T. Yost
*Attorney, Agent, or Firm*—Kinney & Lange

[57] ABSTRACT

An apparatus for supporting a pipe and pipe snapping tool having the advantages of ease of assembly and disassembly and portability. The apparatus includes a main support and pair of upwardly opening pipe trays fixedly attached to the main support and aligned with each other along the longitudinal axis of the main support. The pipe trays are separated from each other by a predetermined space adjacent the center of the main support to create a support gap over which the pipe to be cut lies when supported on the pipe trays. Wall supports, attached to each of the pipe trays at the inner and outer ends thereof, extend to the main support to raise the pipe trays above the main support such that the lower jaw of a pipe snapping tool positioned between the wall supports will lie beneath a pipe spanning the support gap when supported by the pipe trays. A lateral support is releasably attached to and disposed laterally of an substantially perpendicular to the main support, and centered between the support walls, providing a lateral support for one handle of the pipe snapping tool positioned thereon.

6 Claims, 5 Drawing Figures

U.S. Patent  Aug. 20, 1985  4,535,924
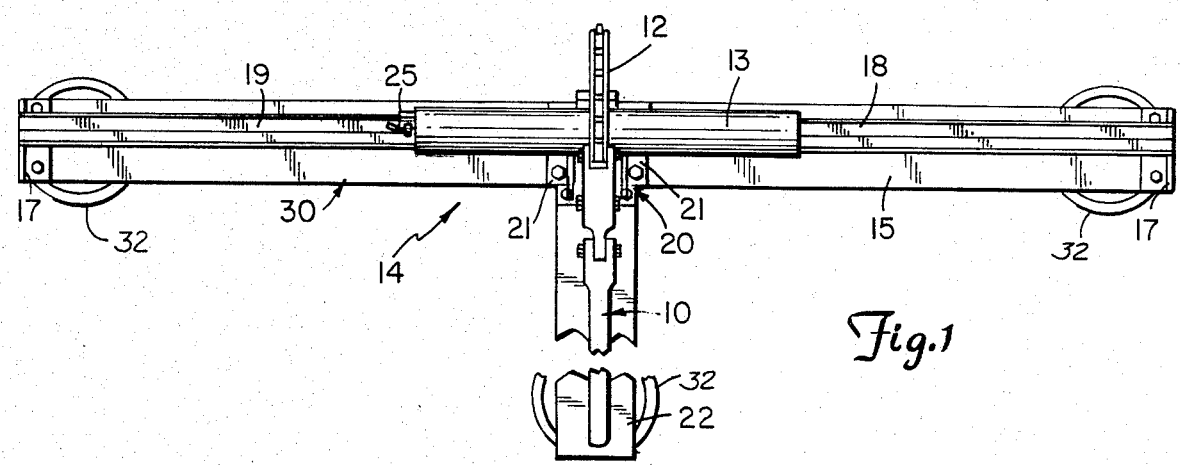
Fig.1
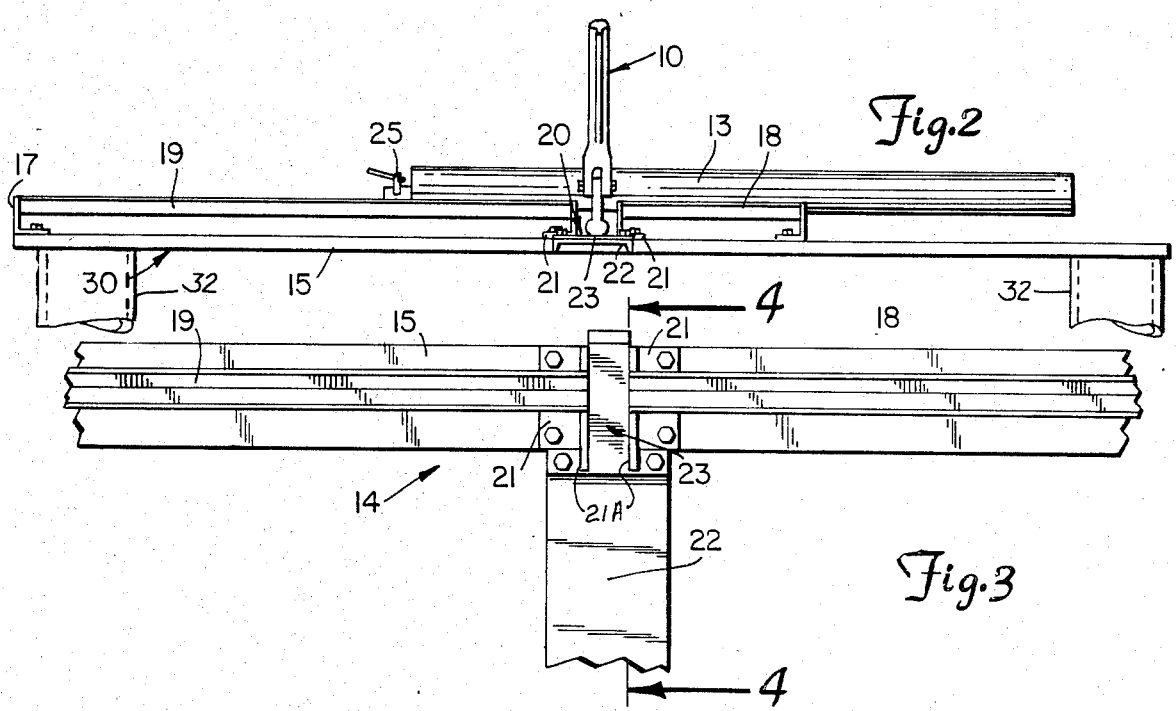
Fig.2
Fig.3
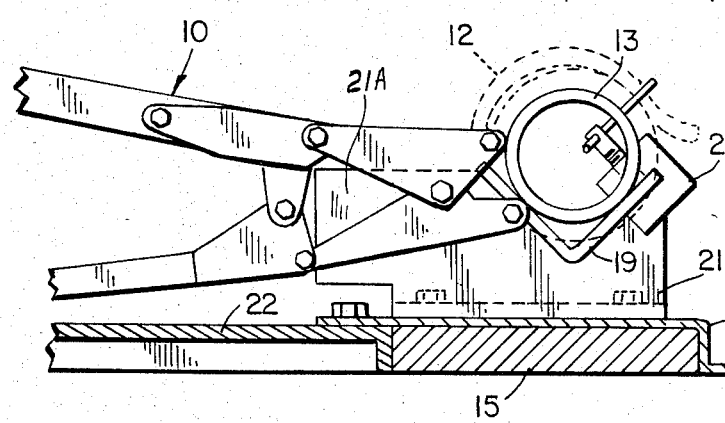
Fig.4
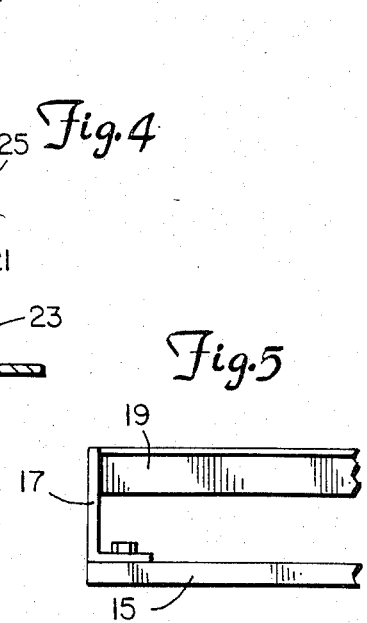
Fig.5

APPARATUS FOR SUPPORTING A PIPE AND PIPE SNAPPING TOOL

BACKGROUND OF THE INVENTION

1. Field of the Invention

The present invention relates generally to apparatus used to support a cast iron pipe and pipe snapping or breaking tool.

2. Description of the Prior Art

In the pipe snapping or cutting field, various pipe-cutters have self contained mechanisms for supporting the pipe to be cut or snapped.

U.S. Pat. No. 3,341,098 to Singley discloses a pipe cutting tool and support elements for positioning the pipe to be cut. A pipe to be cut in unequal lengths supported on the Singley support mechanism will be difficult to hold in perpendicular alignment with the jaws of the pipe breaking tool as it will tend to tip off the support mechanism.

U.S. Pat. No. 3,244,339 to Carner discloses a pipe snapping mechanism utilizing a large support table and hydraulic operated snapping arm, not compatible with a hand operated portable pipe snapping tool.

U.S. Pat. No. 3,049,956 to Lynch illustrates a bolt cutter mounted on a support that holds the bolt cutter perpendicular to the bolt to be cut. The apparatus must be disassembled to remove the bolt cutter from the mount.

U.S. Pat. No. 3,084,431 to Steierman discloses a glass rod cutter that utilizes rotating rollers for supporting the member to be cut.

None of these prior art support apparatus offer ease of assembly or disassembly or portability.

SUMMARY OF THE INVENTION

The present invention includes apparatus for supporting a cast iron pipe to be cut and a pipe snapping (breaking) tool, which offers ease of assembly and disassembly and portability. The support apparatus includes a support base comprising an elongated main support and a pair of pipe trays fixedly attached to the main support and aligned with each other along the longitudinal axis of the main support. The pipe trays are separated from each other by a predetermined space adjacent to the center of the main support to create a support gap over which the pipe to be cut lies when supported on the pipe trays.

Wall supports attached to the ends of each pipe tray at opposite sides of the support gap, extend perpendicular to the longitudinal axis of the pipe trays, to the main support. The wall supports face each other across the support gap and space the pipe trays on the main support such that the lower jaw of a pipe snapping or breaking tool can be positioned between the wall supports. The lower jaw of the pipe snapping tool will lie below a pipe spanning the support gap when the pipe is supported by the pipe trays.

A lateral support preferably having squared longitudinal ends, is releasably attached to and disposed laterally of and substantially perpendicular to the longitudinal axis of the main support. The lateral support is centered between the wall supports to provide a laterally extending firm base for one handle of the chain type pipe snapping tool positioned thereon. When attached to the main support, the lateral support is positioned at a right angle to the longitudinal axis of the pipe trays and pipe supported thereon, thus aiding in positioning the pipe snapping tool at a right angle to a pipe supported on the pipe trays.

BRIEF DESCRIPTION OF THE DRAWINGS

FIG. 1 is a top plan view of a pipe support made according to the present invention, showing a pipe positioned thereon.

FIG. 2 is a rear elevation view of the device of FIG. 1.

FIG. 3 is an enlarged top view of the pipe support of the present invention showing the area where a pipe snapping tool will be placed for snapping a pipe.

FIG. 4 is a sectional view of the apparatus of the present invention, taken along the line 4—4 in FIG. 3.

FIG 5 is an enlarged rear view of an outer end support for a pipe tray used with the device of the present invention.

DETAILED DESCRIPTION OF THE PREFERRED EMBODIMENTS

A pipe and pipe snapping tool support assembly 14 is generally shown in FIG. 1. Support assembly 14 of the present invention includes a base support 30 comprising an elongated main support 15 and a pair of V-shaped angle iron pipe trays 18 and 19 fixedly attached to main support 15. Spaced above the upper surface of main support 15 with transverse wall supports 21,21 in the center portion of the main support 15, and with outer end supports 17,17 at their outer ends, pipe trays 18 and 19 are aligned with each other along the longitudinal axis of main support 15. Pipe trays 18 and 19 are also separated from each other by a predetermined space adjacent the center of main support 15 to provide a support gap 20 over which a pipe 13 to be cut lies when supported on pipe trays 18 and 19.

Wall supports 21,21 attached to the inner ends of pipe trays 18 and 19 have upright walls that extend, perpendicular to the longitudinal axis of pipe trays 18 and 19, to base support 15, facing each other across support gap 20. When so positioned, the lower jaw of a conventional pipe chain type snapping or breaking tool 10 can be positioned between the upright walls of wall supports 21,21 and it will lie below pipe 13 in the section spanning support gap 20 when pipe 13 is supported by pipe trays 18 and 19, as shown in FIG. 4. The pipe snapping tool 10 may include a snapping chain 12 which surrounds pipe 13 and is connected by its ends to the jaws of snapping tool 10 in a conventional manner. The handles of the pipe snapping tool are separated when chain 12 is initially placed around the pipe, and are moved together to tighten the chain onto the pipe to break or snap the pipe. The pipe snapping tool is used with cast iron pipe, which will break clearly under the compression load of the chain.

A lateral support 22 with squared longitudinal ends is releasably attached to and laterally disposed with respect to main support 15, and is centered between wall supports 21,21. The lateral support 22 provides a lateral base for the lower handle of pipe snapping tool 10 having its jaws positioned in support gap 20, as shown in FIG. 4.

In a preferred embodiment, lateral support 22 is attached to main support 15 by a bracket 23 having a plate portion fixed to the top of a first end of lateral support 22, and extending across the center of the main support at support gap 20, and having a lip bent down and over the opposite side of main support 15 from lateral support 22. The bracket permits lateral support 22 to be moved from main support 15 by lifting upwardly when support assembly 14 is going to be moved from one place to another, and easily replaced when it is to be used again. The bracket 23 keeps lateral support 22 properly located relative to main support 15.

When a pipe length is to be cut, pipe 13 (a cast iron sewer pipe) is placed on the trays 18 and 19 with the desired cut line generally centered between the upright walls of wall supports 21,21. The lower jaw of pipe snapping tool 10 will be below pipe 13 and chain 12 is wrapped around pipe 13 and placed on the other jaw when the handles of the pipe snapping tool 10 are separated. Once chain 12 is fastened the handles will be separated and the lower handle will be resting on the lateral support. The tool will bend to move itself to a right angle portion relative to the pipe merely by hitting or jogging the upper handle a few times. The chain 12 will tighten and tend to cause the lower handle to slide on the lateral support to a right angle portion. Hitting the upper handle two or three times will serve the purpose for alignment. When aligned, the operator pushes down on the upper handle while the outer end of the lower handle rests on lateral support 22. The closing force of the handles, reacted to the lateral support, will cause the chain to tighten and snap (break) pipe 13.

An adjustable stop 25 may be provided. Stop 25 is adjustably clamped to either pipe tray 18 or 19 for engagement with an end of pipe 13 supported thereon such that equal lengths of pipe 13 can be repeatedly cut. A preferred stop 25 is a resilient bumper designed to absorb the longitudinal force exerted on pipe 13 by pipe snapping tool 10 when pipe 13 is cut.

In a preferred embodiment, pipe trays 18 and 19 are of different length such that the center of gravity of pipe 13 will cause one end of pipe 13 to tip off pipe tray 18 or 19 upon which it is resting after the cut is made, as shown in FIG. 2.

Preferably the upright walls of wall supports 21,21 are sufficiently high and of sufficient longitudinal length in the section near the handles of pipe snapping tool 10 to hold pipesnapping tool 10 generally upright when pipe snapping tool 10 is not being held by an operator after the snapping or breaking of pipe 13. Note that the walls of supports 21 may extend rearwardly toward the handles of the pipe snapping tool as shown at 21A. The wall supports are cut away below the wall portions 21A to provide clearance to permit removal and replacement of the bracket 23.

The main and lateral supports may be supported off the floor or ground, for example with support, such as concrete blocks, to minimize the need to bend and stoop when operating the cutter and moving the pipe. However, as shown the supports are conveniently supported on lengths of plastic pipe 32, about 12 inches in diameter and about 12 to 16 inches long. The ends of the pipe lengths may be accurately cut to provide a stable support. Using four such lengths, for example, one at each end of main support 15 and also in the center, and another at the outer end of lateral support 22 will be adequate. The entire unit is made portable because the lateral support can be removed from the main support and placed alongside each other and the tube section slipped over the supports to hold the main and lateral support together and also easily transport the pipe section 32.

The apparatus of the present invention provides a support for a pipe snapping tool and pipe to be broken or snapped, which can be readily assembled or disassembled for enhanced portability not available in the prior art. With a minimum of parts, it positions the pipe and the pipe snapping tool in place to assure accurate cuts. Because of its universal design, it can be utilized with various conventional hand-operated pipe snapping tools.

Although the present invention has been described with reference to the preferred embodiments, a person skilled in the art will recognize that changes may be made in the form and detail without departing from the spirit and scope of the present invention.

What is claimed is:

1. A support for supporting a pipe to be cut and a pipe snapping tool having a pair of handles and a pair of actuator jaws, the support comprising:

base support means for supporting a pipe to be cut and the jaws of a pipe snapping tool, comprising elongated main support means and a pair of upwardly opening pipe trays fixedly attached to the main support means and aligned with each other along the longitudinal axis of the main support means, said pipe trays being separated from each other by a predetermined space adjacent the center of the main support means to create a support gap over which the pipe to be cut lies when supported on the pipe trays;

wall support means attached to the ends of each pipe tray at opposite sides of the support gap and extending perpendicular to the longitudinal axis of the pipe trays, and facing each other across the support gap, the wall support means spacing the pipe trays on the main support such that the lower jaw of a pipe snapping tool may be positioned between the wall support means, and will lie below a pipe spanning the support gap when supported by the pipe trays; and lateral support means releasably attached to and disposed laterally of an substantially perpendicular to the main support means, and being centered between the wall support means, to provide a laterally extending base for one handle of a pipe snapping tool positioned between the wall support means.

2. The assembly of claim 1 further comprising an adjustable stop means adjustably clamped to one pipe tray for engagement with an end of a pipe on the tray, such that equal lengths of a pipe can be repeatedly cut.

3. The assembly of claim 2 wherein the stop means is a resilient bumper designed to absorb the longitudinal force exerted on a pipe by the pipe snapping tool when the pipe is cut.

4. The assembly of claim 1 wherein the lateral support means is attached to the main support means by a bracket having a plate portion fixed to the top of a first end of the lateral support means, and extending across the main support means at the support gap, and having a lip bent down and over the opposite side of the main support means from the lateral support means.

5. The assembly of claim 1 wherein one of the pipe trays is shorter than the other and is of lengthsuch that the center of gravity of a pipe cut to a predetermined length will cause one end of the pipe to tip off the pipe tray upon which it is resting after the cut is made.

6. The assembly of claim 1 wherein the wall support means are of a height and length in the direction of the lateral support means so as to support the pipe snapping tool in a generally upright position when such tool is positioned between the wall support means.

* * * * *